US009805765B2

United States Patent
Yamada et al.

(10) Patent No.: US 9,805,765 B2
(45) Date of Patent: *Oct. 31, 2017

(54) RECORDING APPARATUS, REPRODUCING APPARATUS, RECORDING/REPRODUCING APPARATUS, IMAGE PICKUP APPARATUS, RECORDING METHOD AND PROGRAM

(71) Applicant: Sony Corporation, Tokyo (JP)

(72) Inventors: Takaharu Yamada, Tokyo (JP); Atsushi Mae, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 14/247,914

(22) Filed: Apr. 8, 2014

(65) Prior Publication Data

US 2014/0219632 A1 Aug. 7, 2014

Related U.S. Application Data

(63) Continuation of application No. 12/137,175, filed on Jun. 11, 2008, now Pat. No. 8,761,570.

(30) Foreign Application Priority Data

Jul. 26, 2007 (JP) ................................ 2007-193969

(51) Int. Cl.
*H04N 5/765* (2006.01)
*G11B 27/28* (2006.01)
(Continued)

(52) U.S. Cl.
CPC .............. *G11B 27/28* (2013.01); *H04N 5/781* (2013.01); *H04N 5/91* (2013.01); *H04N 9/79* (2013.01);
(Continued)

(58) Field of Classification Search
CPC ............ H04N 9/80; H04N 5/772; H04N 5/76; H04N 19/169; G06K 9/6232
(Continued)

(56) References Cited

U.S. PATENT DOCUMENTS 6,160,950 A 12/2000 Shimazaki et al.
6,606,451 B2 * 8/2003 Honda ................. G11B 27/002
348/E5.112

(Continued)

FOREIGN PATENT DOCUMENTS

CN 1750647 A 3/2006
EP 1 164 791 A1 12/2001
(Continued)

OTHER PUBLICATIONS

Extended European Search Report issued Feb. 3, 2016 in Patent Application No. 15168425.5.

(Continued)

*Primary Examiner* — Jayesh Jhaveri
(74) *Attorney, Agent, or Firm* — Oblon, McClelland, Maier & Neustadt, L.L.P.

(57) ABSTRACT

A recording apparatus is disclosed. The recording apparatus includes a data input portion configured to input data, a first moving image signal recording portion configured to record, based on the input data, a first moving image signal having a first image quality attribute, a condition detector configured to detect that the input data satisfies a predetermined condition during recording of the first moving image signal, and a second moving image signal recorder configured to record, based on the input data, a second moving image signal having a second image quality attribute when the condition detector detects that the input data satisfies the predetermined condition.

21 Claims, 15 Drawing Sheets

(51) Int. Cl.
*H04N 9/804* (2006.01)
*H04N 9/82* (2006.01)
*H04N 9/79* (2006.01)
*H04N 5/781* (2006.01)
*H04N 5/91* (2006.01)
*H04N 5/77* (2006.01)
*H04N 5/76* (2006.01)
*H04N 9/80* (2006.01)
*G06K 9/62* (2006.01)
*H04N 19/169* (2014.01)
*H04N 5/225* (2006.01)

(52) U.S. Cl.
CPC ......... *H04N 9/8042* (2013.01); *H04N 9/8205* (2013.01); *G06K 9/6232* (2013.01); *H04N 5/225* (2013.01); *H04N 5/76* (2013.01); *H04N 5/772* (2013.01); *H04N 9/80* (2013.01); *H04N 19/169* (2014.11)

(58) Field of Classification Search
USPC ...... 386/68, 95, 224–228; 725/9; 348/14.01, 348/14.08, 14.12
See application file for complete search history.

(56) References Cited

U.S. PATENT DOCUMENTS

| | | | |
|---|---|---|---|
| 6,734,909 B1 | 5/2004 | Terane et al. | |
| 6,871,010 B1* | 3/2005 | Taguchi | H04N 5/23293 348/220.1 |
| 7,834,923 B2* | 11/2010 | Stavely | G11B 27/032 348/218.1 |
| 8,761,570 B2* | 6/2014 | Yamada | H04N 9/8042 348/14.01 |
| 2002/0064314 A1 | 5/2002 | Comaniciu et al. | |
| 2003/0031460 A1 | 2/2003 | Obrador | |
| 2003/0065803 A1* | 4/2003 | Heuvelman | H04N 21/25808 709/231 |
| 2003/0193578 A1 | 10/2003 | Parulski et al. | |
| 2004/0247291 A1 | 12/2004 | Hamamoto et al. | |
| 2005/0055717 A1 | 3/2005 | Daniels | |
| 2005/0063566 A1* | 3/2005 | Beek | A61B 5/0059 382/115 |
| 2005/0111832 A1* | 5/2005 | Okauchi | G11B 27/105 386/241 |
| 2006/0080716 A1 | 4/2006 | Nishikawa et al. | |
| 2006/0110137 A1 | 5/2006 | Tsuda et al. | |
| 2006/0115235 A1* | 6/2006 | Takikawa | H04N 5/772 386/232 |
| 2007/0013776 A1* | 1/2007 | Venetianer | G06K 9/00771 348/143 |
| 2007/0025722 A1* | 2/2007 | Matsugu | G03B 17/16 396/263 |
| 2007/0035632 A1 | 2/2007 | Silvernail et al. | |
| 2007/0094602 A1 | 4/2007 | Murabayashi | |
| 2007/0291104 A1* | 12/2007 | Petersen | G01S 3/7865 348/14.01 |
| 2008/0161661 A1 | 7/2008 | Gizewski | |
| 2008/0263012 A1 | 10/2008 | Jones | |
| 2010/0060783 A1* | 3/2010 | Belt | H04N 19/132 348/441 |

FOREIGN PATENT DOCUMENTS

| | | |
|---|---|---|
| EP | 1 278 134 A2 | 1/2003 |
| EP | 1 646 235 A2 | 4/2006 |
| EP | 1 748 378 A1 | 1/2007 |
| EP | 1 781 027 A2 | 5/2007 |
| JP | 2004-166131 | 6/2004 |
| JP | 2004-309920 | 11/2004 |
| JP | 2004-343401 A | 12/2004 |
| JP | 2005-109606 | 4/2005 |
| JP | 2005-117369 | 4/2005 |
| JP | 2005-328148 | 11/2005 |
| JP | 2005-347895 | 12/2005 |
| JP | 2006-109119 | 4/2006 |
| WO | WO 98/19450 A2 | 5/1998 |
| WO | WO 98/19450 A3 | 5/1998 |

OTHER PUBLICATIONS

Partial European Search Report issued Oct. 7, 2015 in Patent Application No. 15168425.5.
Communication pursuant to Article 94(3) EPC issued Feb. 12, 2014 in European Patent Application No. 11 158 810.9.
Extended European Search Report issued Apr. 28, 2011, in European Patent Application No. 11158810.9.
Summons to attend oral proceedings pursuant to Rule 115(1) EPC issued Sep. 3, 2014 in European Patent Application No. 11158810.9.

* cited by examiner

| Subsidiary moving image identifier 611 | Main moving image identifier 612 | Intra-main-moving-image time information 613 |
|---|---|---|
| 1 | 1 | 60060 |
| 2 | 1 | 300300 |
| 3 | 2 | 240240 |
| ⋮ | ⋮ | ⋮ |

FIG.4

RECORDING APPARATUS, REPRODUCING APPARATUS, RECORDING/REPRODUCING APPARATUS, IMAGE PICKUP APPARATUS, RECORDING METHOD AND PROGRAM

CROSS REFERENCES TO RELATED APPLICATIONS

This application is a continuation of and claims the benefit of priority from U.S. Ser. No. 12/137,175, filed Jun. 11, 2008, which claims the benefit of priority from Japanese Patent Application No. 2007-193969, filed Jul. 26, 2007, the entire contents of each of which are incorporated herein by reference.

BACKGROUND OF THE INVENTION

1. Field of the Invention

The present invention relates to a recording/reproducing apparatus. In particular, the present invention relates to a recording apparatus, a reproducing apparatus, a recording/reproducing apparatus, an image pickup apparatus which record/reproduce data including an image, a processing method therefor, and a program for causing a computer to execute the processing method.

2. Description of the Related Art

A recording/reproducing apparatus such as a camcorder or a VCR (videocassette recorder) records input data in accordance with a user's instruction for recording. The camcorder starts to record a pickup image when a user presses a record instruction button (REC button), and stops recording when the user presses the record instruction button again. Meanwhile, the VCR starts to record a TV program in response to pressing of the record instruction button, and also often performs programmed recording in accordance with a program of recording.

In many cases, the user is interested only in a part of image data thus recorded. For example, the user may desire to reproduce only scenes of people or scoring scenes in sports games out of the entire pickup image. In the past, to reproduce only the desired scenes, sections considered to be important have been extracted from the image data recorded, and the extracted sections are organized, thereby generating a digest version of the image. For example, the following information processing apparatus has been proposed. In the information processing apparatus, a frequency intensity distribution of audio signals is subjected to matching with a frequency intensity distribution registered as an important pattern. When there is a part in which the degree of similarity between the two distributions is equal to or larger than a threshold, the part is judged to be an important part (especially interesting part), and is copied and separately recorded (see, for example, Japanese Patent Application Laid-open No. 2004-309920, FIG. 1).

SUMMARY OF THE INVENTION

In related art mentioned above, important parts are extracted from image data recorded once and are organized. However, to partially extract input data that has been totally recorded, it is necessary to perform an extract processing on the input data from an initial section thereof, which involves a longer period of time. In addition, changing image quality of the data thus extracted involves re-encoding of the data, which is increasingly time-consuming. In particular, even if the extracted data is to be reproduced with high image quality, it is generally difficult to reproduce the data with higher image quality than the recorded image.

In view of the above-mentioned circumstances, it is desirable to utilize a feature section including feature data of input data that is recorded as a main moving image, as a subsidiary moving image that has an image quality attribute different from that of the main moving image.

According to an embodiment of the present invention, there are provided a recording apparatus, a recording method, and a program for causing a computer to execute the method. The recording apparatus includes data input means for inputting data, first moving image signal recording means for recording, based on the input data, a first moving image signal having a first image quality attribute, condition detection means for detecting that the input data satisfies a predetermined condition during recording of the first moving image signal, and second moving image signal recording means for recording, based on the input data, a second moving image signal having a second image quality attribute when the condition detection means detects that the input data satisfies the predetermined condition. This structure exerts such an effect that when it is detected that the predetermined condition is satisfied during recording of the first moving image signal based on the input data, the second moving image signal is recorded based on the input data.

Further, according to the embodiment of the present invention, in the recording apparatus, the predetermined condition may be a condition that the input data includes face image data. This exerts such an effect that the second moving image signal is recorded upon detection of the face image data from the input data.

Further, according to the embodiment of the present invention, in the recording apparatus, the second moving image signal recording means may continuously record the second moving image signal while the predetermined condition is satisfied. Alternatively, the second moving image signal recording means may continuously record the second moving image signal for a predetermined time period starting from when the predetermined condition starts to be satisfied.

Further, according to the embodiment of the present invention, the recording apparatus may further include management information recording means for recording management information that indicates association between the second moving image signal and a record position thereof in the first moving image signal. This structure exerts such an effect that the first moving image signal and the second moving image signal are associated with each other.

Further, according to the embodiment of the present invention, in the recording apparatus, the first moving image signal recording means may record the first moving image signal on a first recording medium and the second moving image signal recording means may record the second moving image signal on a second recording medium different from the first recording medium. This exerts such an effect that the first and the second moving image signals are capable of being reproduced in apparatuses different from each other.

Further, according to the embodiment of the present invention, in the recording apparatus, the first image quality attribute may have a higher image quality than the second image quality attribute, and vice versa. In addition, the first image quality attribute may have a higher bit rate than the second image quality attribute, and vice versa.

According to another embodiment of the present invention, there is provided an image pickup apparatus including imaging means for imaging a subject to generate imaging data thereof, first moving image signal recording means for recording, based on the imaging data, a first moving image signal having a first image quality attribute, condition detection means for detecting that the imaging data satisfies a predetermined condition during recording of the first moving image signal, and second moving image signal recording means for recording, based on the imaging data, a second moving image signal having a second image quality attribute when the condition detection means detects that the imaging data satisfies the predetermined condition. This structure exerts such an effect that when it is detected that the predetermined condition is satisfied during recording of the first moving image signal based on the imaging data, the second moving image signal is recorded based on the imaging data.

According to another embodiment of the present invention, there is provided a reproducing apparatus including first holding means for holding a first moving image signal, second holding means for holding a second moving image signal that has an image quality attribute with image quality lower than that of the first moving image signal, management information holding means for holding management information that indicates association between the second moving image signal and a record position thereof in the first moving image signal, list display means for displaying a list of the second moving image signals, operation reception means for receiving an operation of selecting one of the second moving image signals in the list, and reproducing means for extracting, when the one of the second moving image signals is selected, a record position in the first moving image signal associated with the selected second moving image signal based on the management information, and reproducing the first moving image signal from the record position. This structure exerts such an effect that, based on the list of the second moving image signals displayed, the first moving image signal is reproduced from the corresponding record position thereof.

According to another embodiment of the present invention, there is provided a reproducing apparatus including first holding means for holding a first moving image signal, second holding means for holding a second moving image signal that has an image quality attribute with image quality higher than that of the first moving image signal, management information holding means for holding management information that indicates association between the second moving image signal and a record position thereof in the first moving image signal, reproducing means for showing, when the management information indicates a presence of a second moving image signal associated with the corresponding record position of the first moving image signal, the presence of the second moving image signal during reproducing of the first moving image, and operation reception means for receiving an instruction operation of reproducing the second moving image signal. In the reproducing apparatus, the reproducing means reproduces the second moving image signal in response to the instruction operation of reproducing the second moving image signal. This structure exerts such an effect that, based on the reproduction position of the first moving image signal, the second moving image signal is reproduced.

According to another embodiment of the present invention, there is provided a recording/reproducing apparatus including data input means for inputting data, first moving image signal recording means for recording, based on the input data, a first moving image signal having a first image quality attribute, condition detection means for detecting that the input data satisfies a predetermined condition during recording of the first moving image signal, second moving image signal recording means for recording, based on the input data, a second moving image signal having a second image quality attribute when the condition detection means detects that the input data satisfies the predetermined condition, management information recording means for recording management information that indicates association between the second moving image signal and a record position thereof in the first moving image signal, list display means for displaying a list of the second moving image signals, operation reception means for receiving an operation of selecting one of the second moving image signals in the list, and reproducing means for extracting, when the one of the second moving image signals is selected, a record position in the first moving image signal associated with the selected second moving image signal based on the management information, and reproducing the first moving image signal from the record position. This structure exerts such an effect that when it is detected that the predetermined condition is satisfied during recording of the first moving image signal based on the input data, the second moving image signal is recorded based on the input data, and the first moving image signal is reproduced from the corresponding recording position based on the list of the second moving image signals displayed.

According to another embodiment of the present invention, there is provided a recording/reproducing apparatus including data input means for inputting data, first moving image signal recording means for recording, based on the input data, a first moving image signal having a first image quality attribute, condition detection means for detecting that the input data satisfies a predetermined condition during recording of the first moving image signal, second moving image signal recording means for recording, based on the input data, a second moving image signal having a second image quality attribute when the condition detection means detects that the input data satisfies the predetermined condition, management information recording means for recording management information that indicates association between the second moving image signal and a record position thereof in the first moving, image signal, reproducing means for showing, when the management information indicates a presence of a second moving image signal associated with the corresponding record position of the first moving image signal, the presence of the second moving image signal during reproducing of the first moving image, and operation reception means for receiving an instruction operation of reproducing the second moving image signal. In the recording/reproducing apparatus, the reproducing means reproduces the second moving image signal in response to the instruction operation of reproducing the second moving image signal. This structure exerts such an effect that when it is detected that the predetermined condition is satisfied during recording of the first moving image signal based on the input data, the second moving image signal is recorded based on the input data, and the second moving image signal is reproduced based on the reproduction position of the first moving image signal.

According to another embodiment of the present invention, there is provided a recording apparatus including a data input portion configured to input data, a first moving image signal recording portion configured to record, based on the input data, a first moving image signal having a first image quality attribute, a condition detector configured to detect that the input data satisfies a predetermined condition during recording of the first moving image signal, and a second moving image signal recording portion configured to record, based on the input data, a second moving image signal having a second image quality attribute when the condition detector detects that the input data satisfies the predetermined condition.

According to another embodiment of the present invention, there is provided an image pickup apparatus including an imaging portion configured to image a subject to generate imaging data thereof, a first moving image signal recording portion configured to record, based on the imaging data, a first moving image signal having a first image quality attribute, a condition detector configured to detect that the imaging data satisfies a predetermined condition during recording of the first moving image signal, and a second moving image signal recording portion configured to record, based on the imaging data, a second moving image signal having a second image quality attribute when the condition detector detects that the imaging data satisfies the predetermined condition.

According to another embodiment of the present invention, there is provided a reproducing apparatus, including a first holding portion configured to hold a first moving image signal, a second holding portion configured to hold a second moving image signal that has an image quality attribute with image quality lower than that of the first moving image signal, a management information holding portion configured to hold management information that indicates association between the second moving image signal and a record position thereof in the first moving image signal, a list display portion configured to display a list of the second moving image signals, an operation reception portion configured to receive an operation of selecting one of the second moving image signals in the list, and a reproduction portion configured to extract, when the one of the second moving image signals is selected, a record position in the first moving image signal associated with the selected second moving image signal based on the management information, and reproducing the first moving image signal from the record position.

According to another embodiment of the present invention, there is provided a reproducing apparatus including a first holding portion configured to hold a first moving image signal, a second holding portion configured to hold a second moving image signal that has an image quality attribute with image quality higher than that of the first moving image signal, a management information holding portion configured to hold management information that indicates association between the second moving image signal and a record position thereof in the first moving image signal, a reproduction portion configured to show, when the management information indicates a presence of a second moving image signal associated with the corresponding record position of the first moving image signal, the presence of the second moving image signal during reproducing of the first moving image, and an operation reception portion configured to receive an instruction operation of reproducing the second moving image signal. In the reproducing apparatus, the reproduction portion reproduces the second moving image signal in response to the instruction operation of reproducing the second moving image signal.

According to another embodiment of the present invention, there is provided a recording/reproducing apparatus including a data input portion configured to input data, a first moving image signal recording portion configured to record, based on the input data, a first moving image signal having a first image quality attribute, a condition detector configured to detect that the input data satisfies a predetermined condition during recording of the first moving image signal, a second moving image signal recording portion configured to record, based on the input data, a second moving image signal having a second image quality attribute when the condition detector detects that the input data satisfies the predetermined condition, a management information recording portion configured to record management information that indicates association between the second moving image signal and a record position thereof in the first moving image signal, a list display portion configured to display a list of the second moving image signals, an operation reception portion configured to receive an operation of selecting one of the second moving image signals in the list, and a reproduction portion configured to extract, when the one of the second moving image signals is selected, a record position in the first moving image signal associated with the selected second moving image signal based on the management information, and reproducing the first moving image signal from the record position.

According to another embodiment of the present invention, there is provided a recording/reproducing apparatus including a data input portion configured to input data, a first moving image signal recording portion configured to record, based on the input data, a first moving image signal having a first image quality attribute, a condition detector configured to detect that the input data satisfies a predetermined condition during recording of the first moving image signal, a second moving image signal recording portion configured to record, based on the input data, a second moving image signal having a second image quality attribute when the condition detector detects that the input data satisfies the predetermined condition, a management information recording portion configured to record management information that indicates association between the second moving image signal and a record position thereof in the first moving image signal, a reproduction portion configured to show, when the management information indicates a presence of a second moving image signal associated with the corresponding record position of the first moving image signal, the presence of the second moving image signal during reproducing of the first moving image, and an operation reception portion configured to receive an instruction operation of reproducing the second moving image signal. In the recording/reproducing apparatus, the reproduction portion reproduces the second moving image signal in response to the instruction operation of reproducing the second moving image signal.

The embodiments of the present invention can exhibit such an excellent effect that the feature section including the feature data of the input data that is recorded as the main moving image can be utilized as the subsidiary moving image that has the image quality attribute different from that of the main moving image.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4 is a table showing a configuration example of a management information field according to the embodiment of the present invention;

DESCRIPTION OF PREFERRED EMBODIMENTS

An embodiment of the present invention will be described with reference to the drawings.

Figure 1:
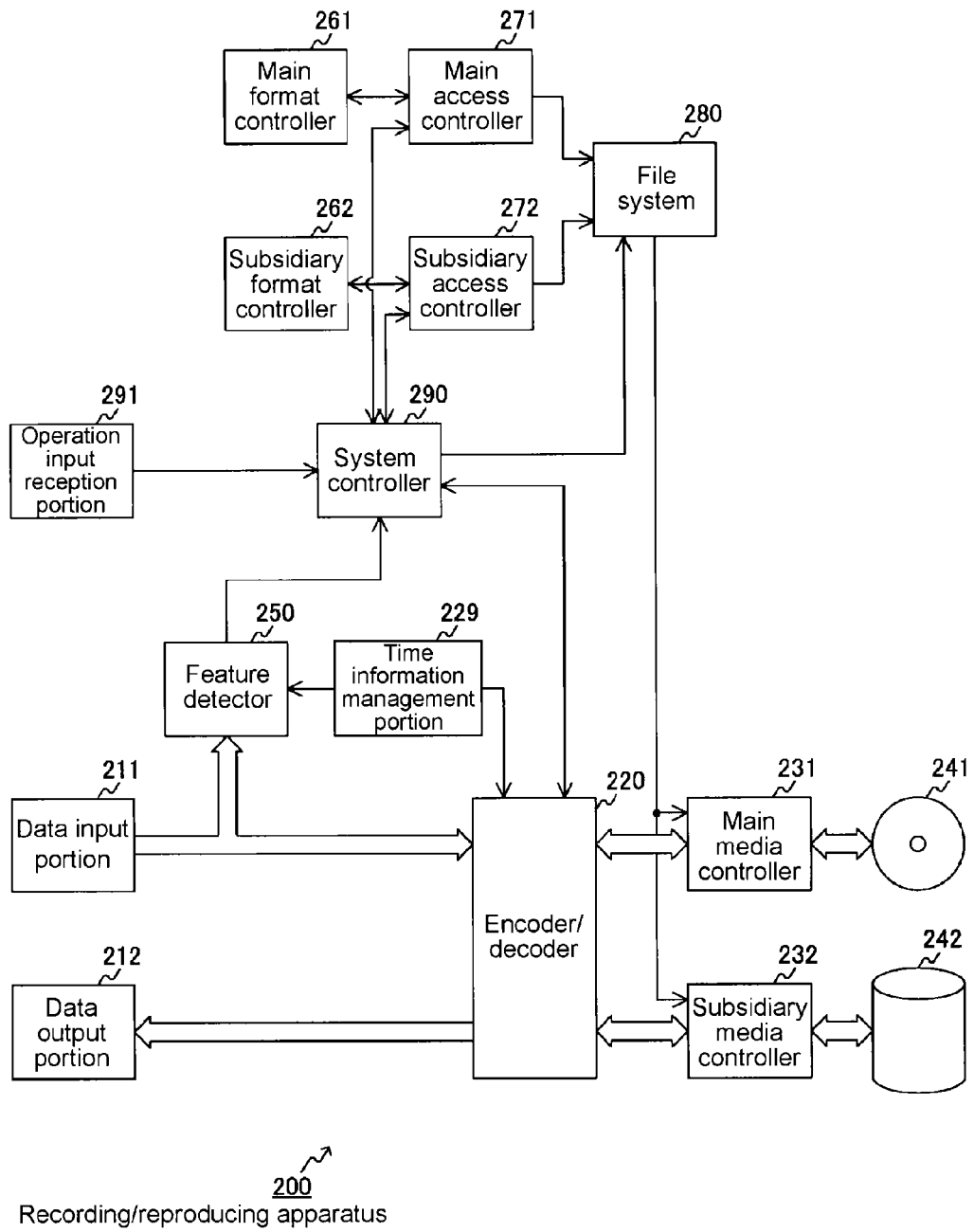
FIG. 1 is a diagram showing a configuration example of a recording/reproducing apparatus according to an embodiment of the present invention.

FIG. 1 is a diagram showing a configuration example of a recording/reproducing apparatus 200 according to the embodiment of the present invention. The recording/reproducing apparatus 200 includes a data input portion 211, a data output portion 212, an encoder/decoder 220, a time information management portion 229, a main media controller 231, a subsidiary media controller 232, a feature detector 250, a main format controller 261, a subsidiary format controller 262, a main access controller 271, a subsidiary access controller 272, a file system 280, a system controller 290, and an operation input reception portion 291.

The recording/reproducing apparatus 200 further includes a recording medium 241 for recording main moving images and a recording medium 242 for recording subsidiary moving images. Herein, the main moving image means a moving image that includes entire sections designated by a user, while the subsidiary moving image means a moving image that corresponds to a partial section (feature section) including feature data.

The data input portion 211 inputs data as a recording target. Herein, the data as the recording target includes moving image data. The moving image data may include audio data. In a case where the recording/reproducing apparatus 200 serves as a part of an image pickup apparatus, picked-up imaging data is the recording target. Therefore, the data input portion 211 may be a camera or an input terminal.

The data output portion 212 outputs data that has been input or recorded. Herein, the data to be output includes moving image data, so the data output portion 212 is materialized as a display apparatus such as an LCD (Liquid Crystal Display).

The encoder/decoder 220 encodes data supplied from the data input portion 211, or decodes data supplied from the main media controller 231 or the subsidiary media controller 232. A configuration example of the encoder/decoder 220 will be described later.

The time information management portion 229 manages time information on data encoded by the encoder/decoder 220. The time information management portion 229 includes a time counter that counts time in units of, e.g., 90 KHz, and gives a frame of the moving image the time information in units of 90 KHz, the initial information of which is an encoding start time of the data. Further, the time information is supplied to the feature detector 250.

The main media controller 231 performs control so that the main moving image data encoded by the encoder/decoder 220 is recorded on the recording medium 241. The subsidiary media controller 232 performs control so that the subsidiary moving image data encoded by the encoder/decoder 220 is recorded on the recording medium 242.

The feature detector 250 extracts the feature data included in the input data supplied from the data input portion 211. Herein, the feature data may be, for example, face image data included in the moving image data. In this case, when it is detected that the face image data is included in the moving image data, the feature detector 250 transmits, to the system controller 290, time information supplied from the time information management portion 229. As a result, upon detection of the face image data in the moving image data during a time period when the main moving image is recorded, the subsidiary moving image is concurrently recorded through the system controller 290. A temporal section in which the subsidiary moving image is concurrently recorded refers to the feature section. It is to be noted that the description is given of the case where the face image data is detected, but another case where specific audio data is detected may be applied to the present invention.

The main format controller 261 controls an application format of the main moving image. The subsidiary format controller 262 controls an application format of the subsidiary moving image. In the embodiment of the present invention, the main moving image is recorded in AVCHD format, while the subsidiary moving image is recorded in MP4 format. However, the present invention is not limited to those.

The main access controller 271 controls write/read of the main moving image data. The subsidiary access controller 272 controls write/read of the subsidiary moving image data. The file system 280 is a system for managing data as a file.

The system controller 290 controls overall operations of read/write of the main moving image and the subsidiary moving image. For example, the system controller 290 performs control so that the subsidiary moving image is associated with the time information on the main moving image and recorded.

The operation input reception portion 291 receives an operation input by a user. The operation input is conducted for instructing record/reproduction of the main moving image and for instructing display of a list of feature scenes, for example.

Figure 2:
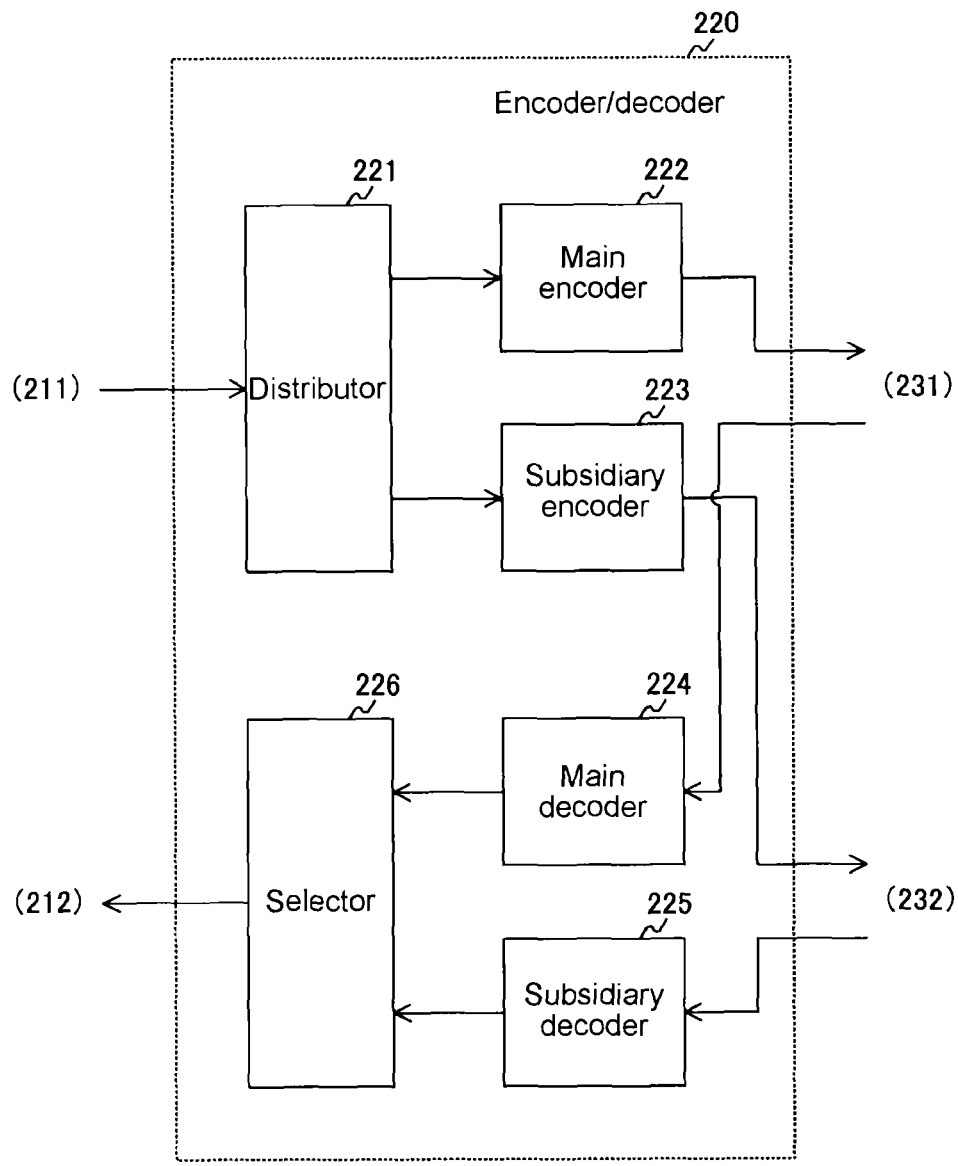
FIG. 2 is a diagram showing a configuration example of an encoder/decoder according to the embodiment of the present invention.

FIG. 2 is a diagram showing a configuration example of the encoder/decoder 220 in the embodiment of the present invention. The encoder/decoder 220 includes a distributor 221, a main encoder 222, a subsidiary encoder 223, a main decoder 224, a subsidiary decoder 225, and a selector 226.

The distributor 221 distributes the data supplied from the data input portion 211 to the main encoder 222 and the subsidiary encoder 223. In a case where the main encoder 222 and the subsidiary encoder 223 perform encoding control, the distributor 221 does not have to perform particular control and only needs to supply data to the main encoder 222 and the subsidiary encoder 223 as it is.

The main encoder 222 encodes the data supplied from the distributor 221 as a main moving image data and outputs the encoded data to the main media controller 231. The subsidiary encoder 223 encodes the data supplied from the distributor 221 as a subsidiary moving image data and outputs the encoded data to the subsidiary media controller 232. In the embodiment of the present invention, MPEG-4 AVC format is used for the encoding of the main moving image data, while MPEG-4 format is used for the encoding of the subsidiary moving image data. However, the present invention is not limited to those.

The main decoder 224 decodes the main moving image data supplied from the main media controller 231 and outputs the decoded data to the selector 226. The subsidiary decoder 225 decodes the subsidiary moving image data supplied from the subsidiary media controller 232 and outputs the decoded data to the selector 226. The selector 226 selects one of the main moving image data output from the main decoder 224 and the subsidiary moving image data output from the subsidiary decoder 225, and outputs the selected moving image data to the data output portion 212.

Figure 3:
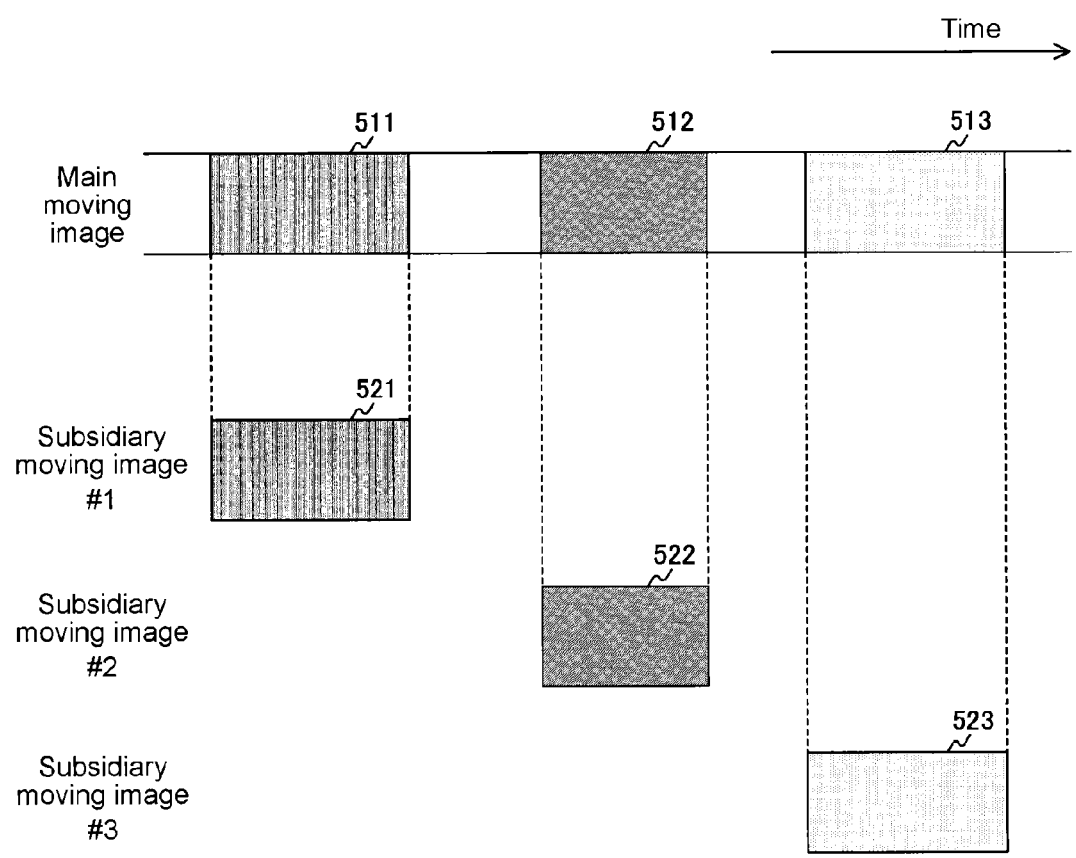
FIG. 3 is a diagram showing an example of a relationship between a main moving image and subsidiary moving images according to the embodiment of the present invention.

FIG. 3 is a diagram showing an example of a relationship between the main moving image and the subsidiary moving images in the embodiment of the present invention. The main moving image includes the entire sections from when the user gives an instruction to start recording till when the user gives an instruction to stop recording. The subsidiary moving image corresponds to a partial section of the main moving image. In this example, a subsidiary moving image #1 521 corresponds to a section 511 of the main moving image. A subsidiary moving image #2 522 corresponds to a section 512 of the main moving image. A subsidiary moving image #3 523 corresponds to a section 513 of the main moving image.

There are recording overlaps on a time axis between the main moving image and the subsidiary moving images, but they have different encoding parameters. The subsidiary moving images may exhibit lower image quality than the main moving image, and vice versa. In addition, the subsidiary moving images may be recorded at a lower bit rate than the main moving image, and vice versa. Those relationships can be determined based on usage patterns of the recorded main moving image and subsidiary moving images. For example, in a case where the subsidiary moving images are used as indexes for reproducing the main moving image, it is desirable to set the image quality of the subsidiary moving images to be lower than that of the main moving image, or record the subsidiary moving images at a lower bit rate than the main moving image. On the other hand, in a case where only a partial section of the main moving image is to be provided with high image quality, it is necessary to set the image quality of the subsidiary moving images to be higher than that of the main moving image, or record the subsidiary moving images at a higher bit rate than the main moving image.

In the embodiment of the present invention, when the features of the face image or the like are detected by the feature detector 250 during the record of the main moving image, the subsidiary moving images 521 to 523 are recorded. In recording the subsidiary moving images, the subsidiary moving images are respectively associated with time information items of the corresponding sections of the main moving images. The association is contained in the following management information.

FIG. 4 is a table showing a configuration example of a management information field according to the embodiment of the present invention. The management information includes fields of a subsidiary moving image identifier 611, a main moving image identifier 612, and intra-main-moving-image time information 613.

The subsidiary moving image identifier 611 is information for identifying the subsidiary moving image. In this example, the subsidiary moving image is identified by number, but may be identified by a file name or the like.

The main moving image identifier 612 is information for identifying the main moving image. In this example, as in the case of the subsidiary moving image, the main moving image is identified by number, but may be identified by a file name or the like.

The intra-main-moving-image time information 613 is information for indicating temporal positions of the subsidiary moving images in the main moving images. The time can be obtained with the above-mentioned time counter for counting time in units of 90 KHz provided to the time information management portion 229.

In this example, the table shows that a first subsidiary moving image is recorded after 60060×(1/90000) seconds from the head of a first main moving image.

Figure 5:
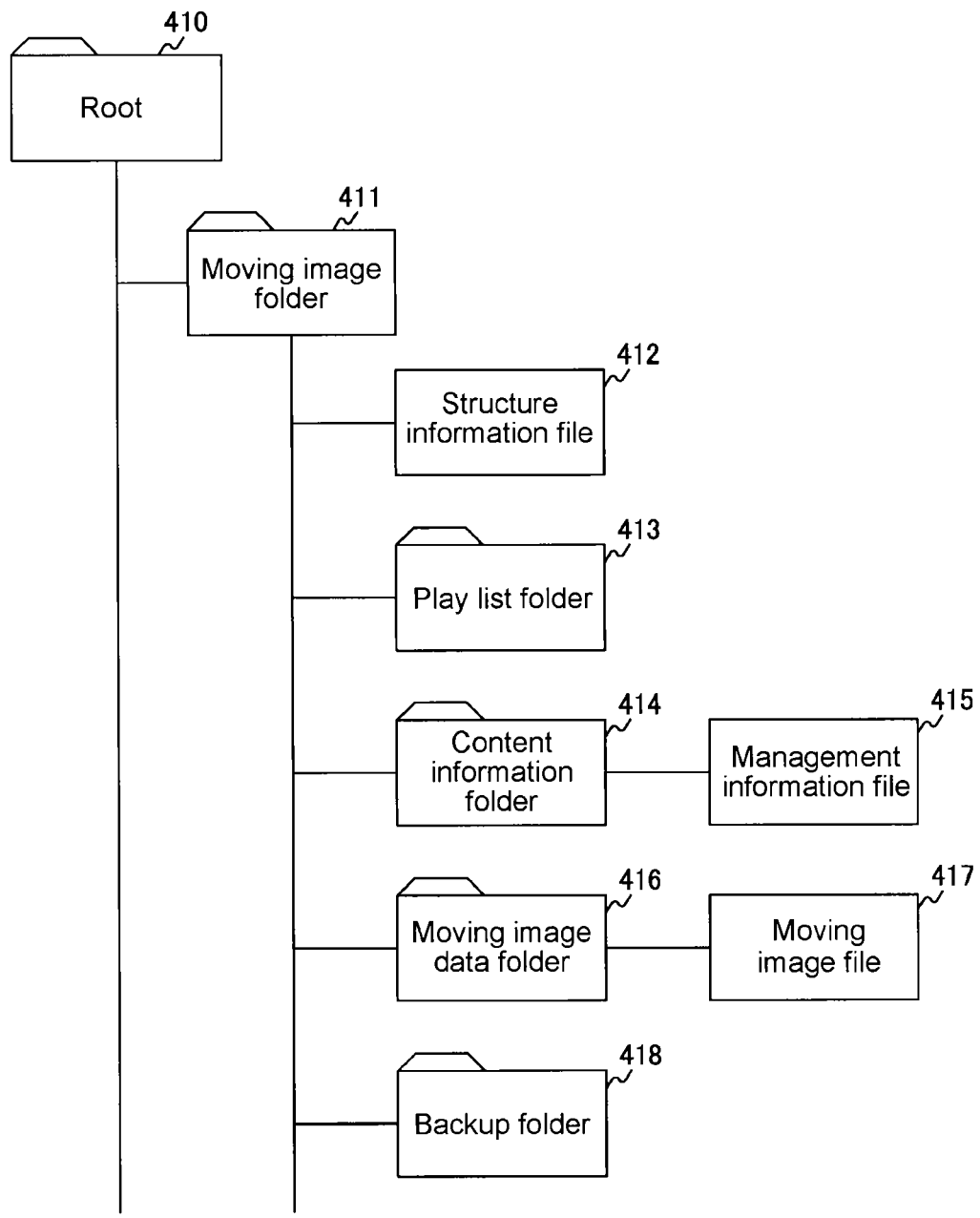
FIG. 5 is a diagram showing a configuration example of folders containing the main moving image according to the embodiment of the present invention.

FIG. 5 is a diagram showing a configuration example of folders that contain the main moving images according to the embodiment of the present invention. In this example, a moving image folder 411 is subordinate to a root folder 410, and a structure information file 412, a play list folder 413, a content information folder 414, a moving image data folder 416, and a backup folder 418 are subordinate to the moving image folder 411.

The structure information file 412 contains information on a structure of moving image data. The play list folder 413 contains a play list obtained by combining the partial sections of the moving image data. The content information folder 414 contains attribute information on the moving image data. The moving image data folder 416 contains the moving image data as a moving image file 417. The backup folder 418 contains a copy for backup.

In the configuration example of the folders, the management information (see. FIG. 4) on the subsidiary moving images associated with the main moving image is contained as a management information file 415 in the attribute information. Thus, the subsidiary moving images can easily be referred to from the main moving image.

Figure 6:
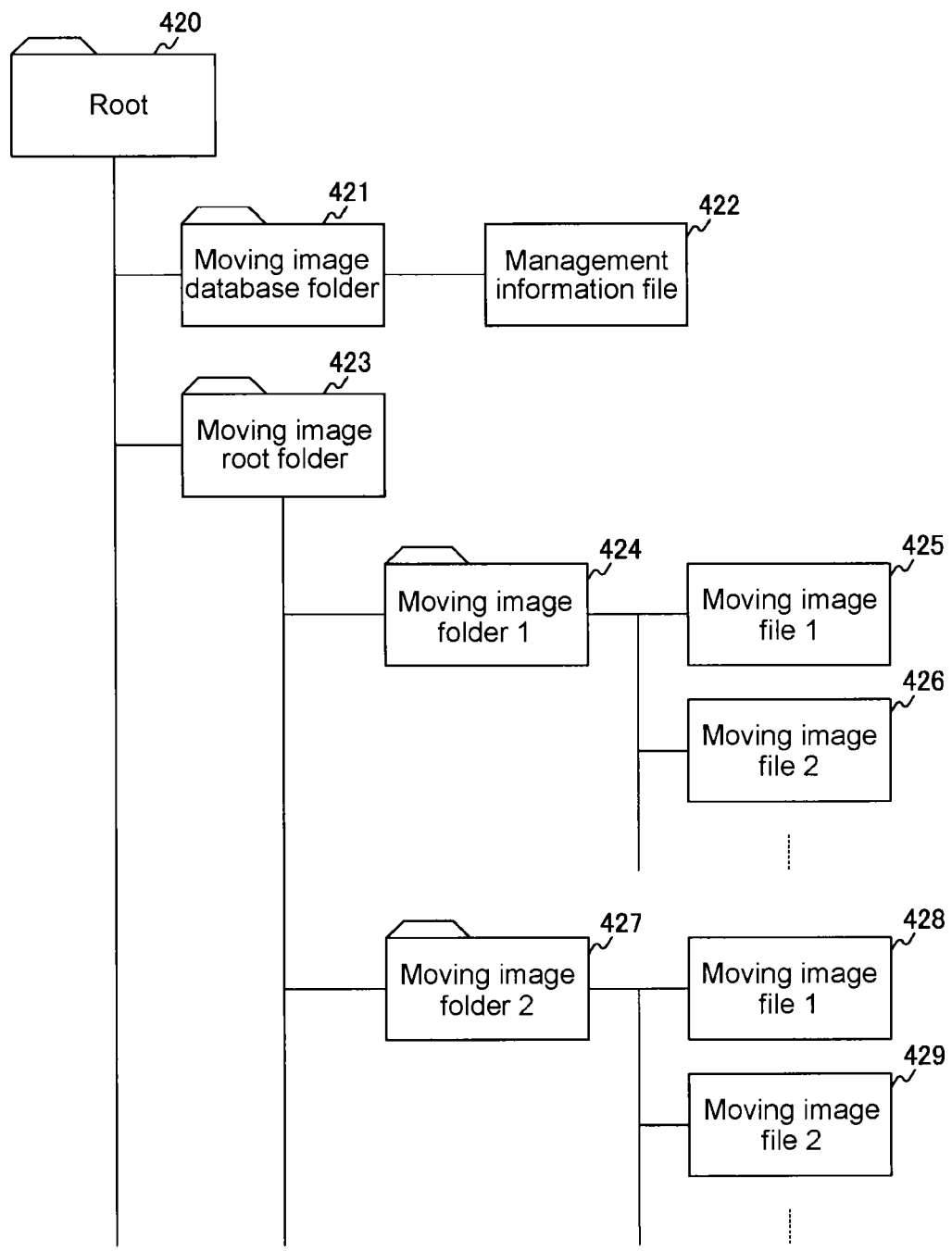
FIG. 6 is a diagram showing a configuration example of folders containing the subsidiary moving images according to the embodiment of the present invention.

FIG. 6 is a diagram showing a configuration example of folders that contain the subsidiary moving images according to the embodiment of the present invention. In this example, a moving image database folder 421 and a moving image root folder 423 are subordinate to a root folder 420. Moving image folders 424 and 427 are subordinate to the moving image root folder 423. Moving image files 425 and 426 are subordinate to the moving image folder 424, while moving image files 428 and 429 are subordinate to the moving image folder 427.

In this configuration example of the folders, the management information (see FIG. 4) on the main moving image associated to the subsidiary moving images is contained as a management information file 422 subordinate to the moving image database folder 421. Therefore, the main moving image can easily be referred to from the subsidiary moving images.

Figure 7:
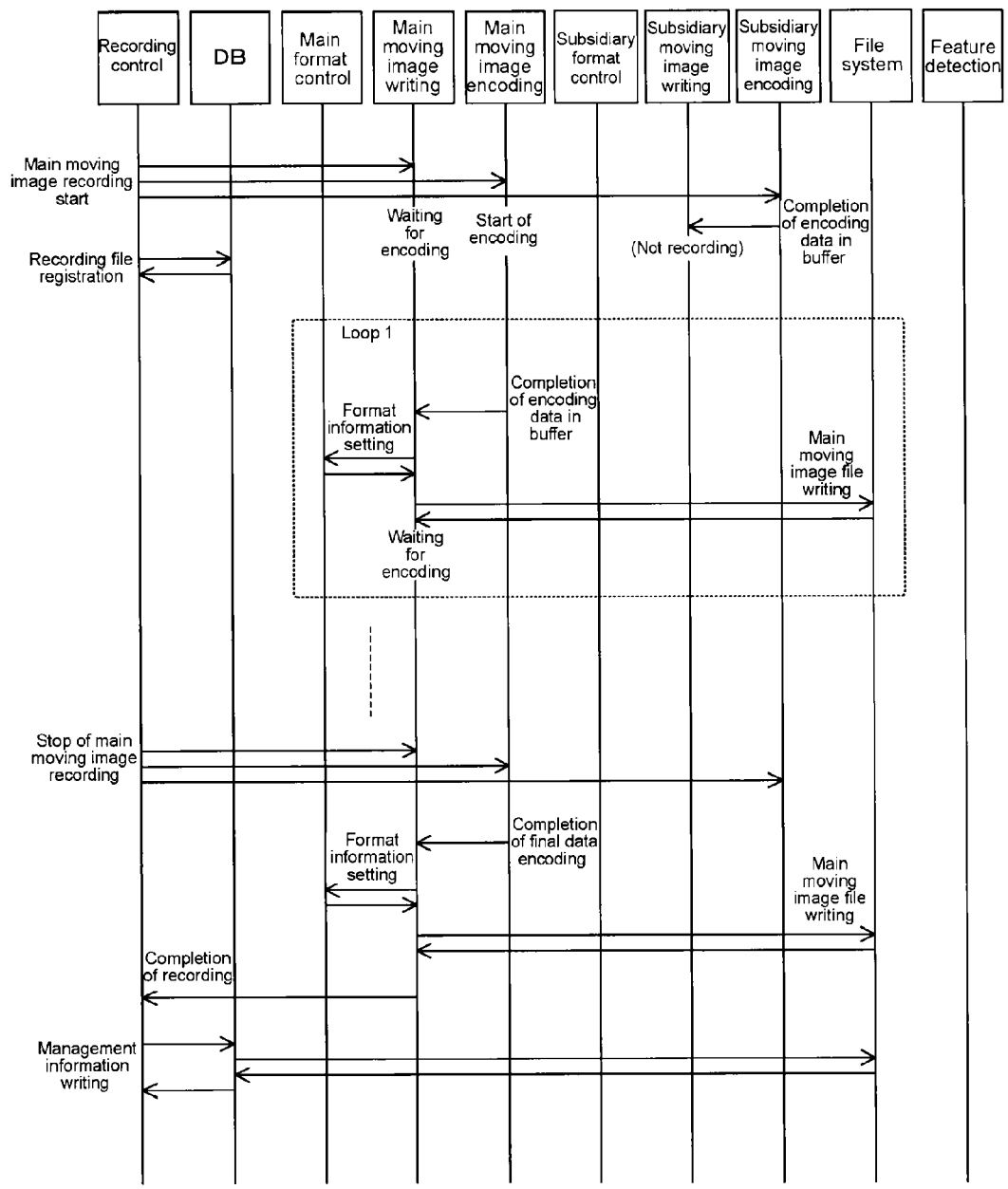
FIG. 7 a sequence chart showing an operation example of recording the main moving image according to the embodiment of the present invention.

FIG. 7 is a sequence chart showing an operation example of recording the main moving image according to the embodiment of the present invention. When the operation input reception portion 291 receives an instruction of starting record of the moving image, the system controller 290 instructs the encoder/decoder 220 to encode the main moving image and the subsidiary moving image and also instructs the main access controller 271 to write the main moving image data (moving image recording start instruction).

When receiving a completion response of start of recording the moving image from the encoder/decoder 220 and the main access controller 271, the system controller 290 registers file information of the main moving image data that has started to be recorded. It is to be noted that the file information may be registered after completion of recording, although the file information is registered at the start of recording in this example.

Thus, the encoder/decoder 220 starts encoding of the main moving image and the subsidiary moving image. Further, the main media controller 231 is on standby until the encoder/decoder 220 encodes the main moving image. When the main moving image and the subsidiary moving images are encoded to a certain degree, the encoder/decoder 220 notifies the system controller 290 of completion of encoding.

When receiving the completion notification of encoding the main moving image, the system controller 290 causes the main format controller 261 to format the main moving image data into an appropriate application format, and causes the main media controller 231 to record the main moving image as a file via the file system 280. Meanwhile, the subsidiary moving image is not recorded even when the completion of encoding the subsidiary moving image is notified. Subsequently, the encoding and the recording of the main moving image are repeated until a moving image recording stop instruction is issued (loop 1).

After that, when the operation input reception portion 291 receives the moving image recording stop instruction, the system controller 290 instructs the encoder/decoder 220 to stop encoding the main moving image and the subsidiary moving image, and the system controller 290 instructs the main access controller 271 to stop writing of the main moving image data (moving image recording stop instruction).

Upon completion of the recording stop, the encoder/decoder 220 notifies the system controller 290 of completion of encoding the final data. When receiving the final data encoding completion notification, the system controller 290 causes the main format controller 261 to format the main moving image data to be an appropriate application format, and causes the main media controller 231 to record the main moving image data as the main moving image file via the file system 280 and to close the file.

Figure 8:
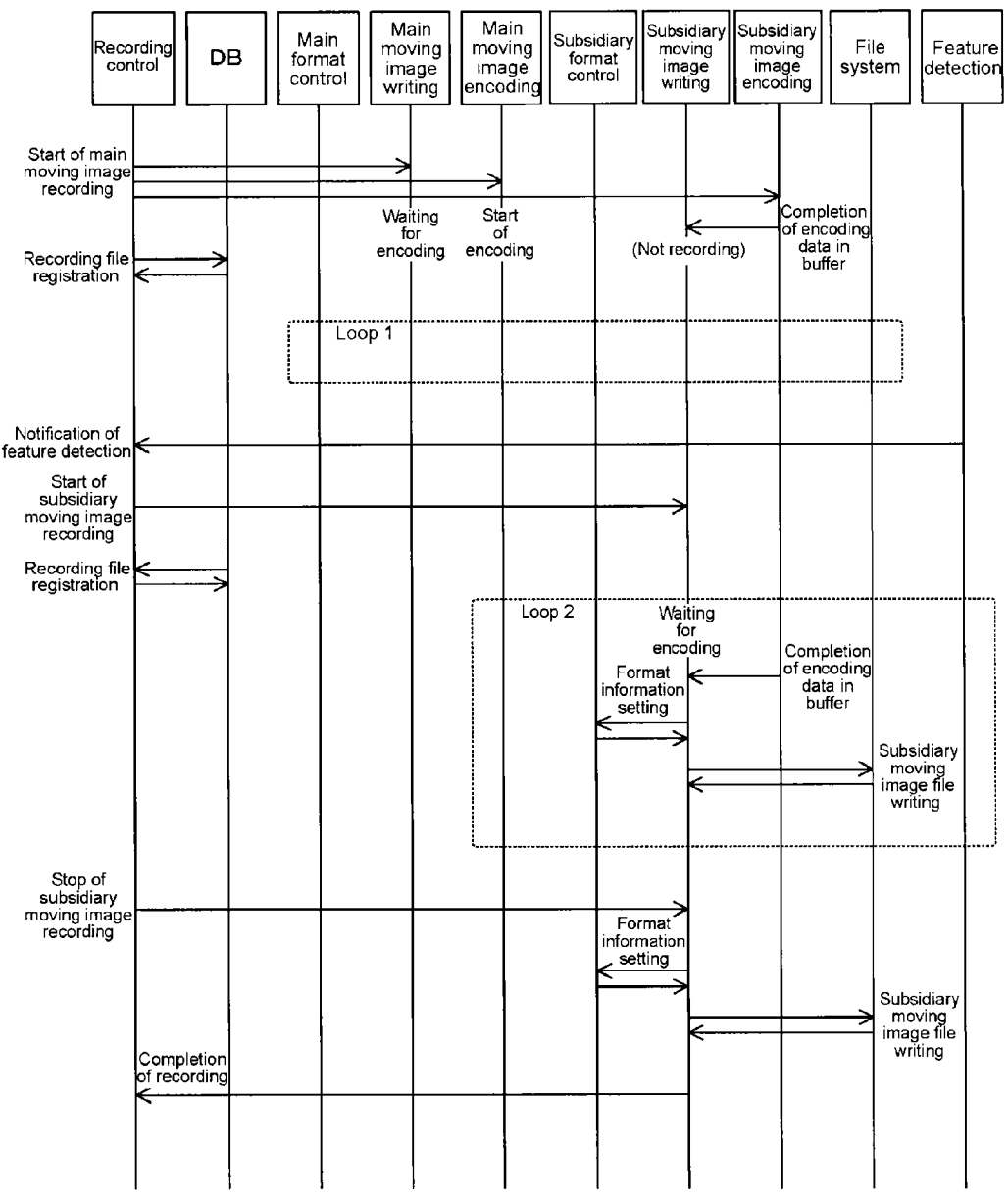
FIG. 8 is a sequence chart showing an operation example of recording the subsidiary moving image according to the embodiment of the present invention.

FIG. 8 is a sequence chart showing an operation example of recording the subsidiary moving image according to the embodiment of the present invention. In the loop 1 (whose content is omitted in FIG. 8) shown in FIG. 7, the main moving image data and the subsidiary moving image data are encoded and stored in a buffer (not shown). The encoded data of the subsidiary moving image stored in the buffer is not recorded as a file, and latest data is updated and overwritten in the buffer.

When the feature detector 250 detects the feature data (e.g., face image data), the system controller 290 is notified of the detection. At this time, the system controller 290 is also notified of the time information managed by the time information management portion 229.

Upon reception of the feature detection notification, the system controller 290 instructs the subsidiary access controller 272 to write the subsidiary moving image data. When receiving a completion response of start of recording the subsidiary moving image from the subsidiary access controller 272, the system controller 290 registers file information of the subsidiary moving image data that has started to be recorded. At this time, the system controller 290 associates the main moving image data with the subsidiary moving image data based on the time information notified by the feature detector 250. In addition, the system controller 290 causes the subsidiary format controller 262 to format the subsidiary moving image data to be an appropriate application format, and causes the subsidiary media controller 232 to record the subsidiary moving image data as a file via the file system 280. The recording processing to the file is repeated each time new encoded data is stored in the buffer (loop 2).

After that, the system controller 290 instructs the subsidiary access controller 272 to stop writing of the subsidiary moving image data at predetermined recording stop timing. The recording stop timing may be timing after a certain period of time from the start of recording the subsidiary moving image, or may be timing at which the feature data is not detected any more.

After that, the system controller 290 causes the subsidiary format controller 262 to format the subsidiary moving image data to be an appropriate application format, and causes the subsidiary media controller 232 to record the subsidiary moving image data as a file via the file system 280 and to close the file.

Figure 9:
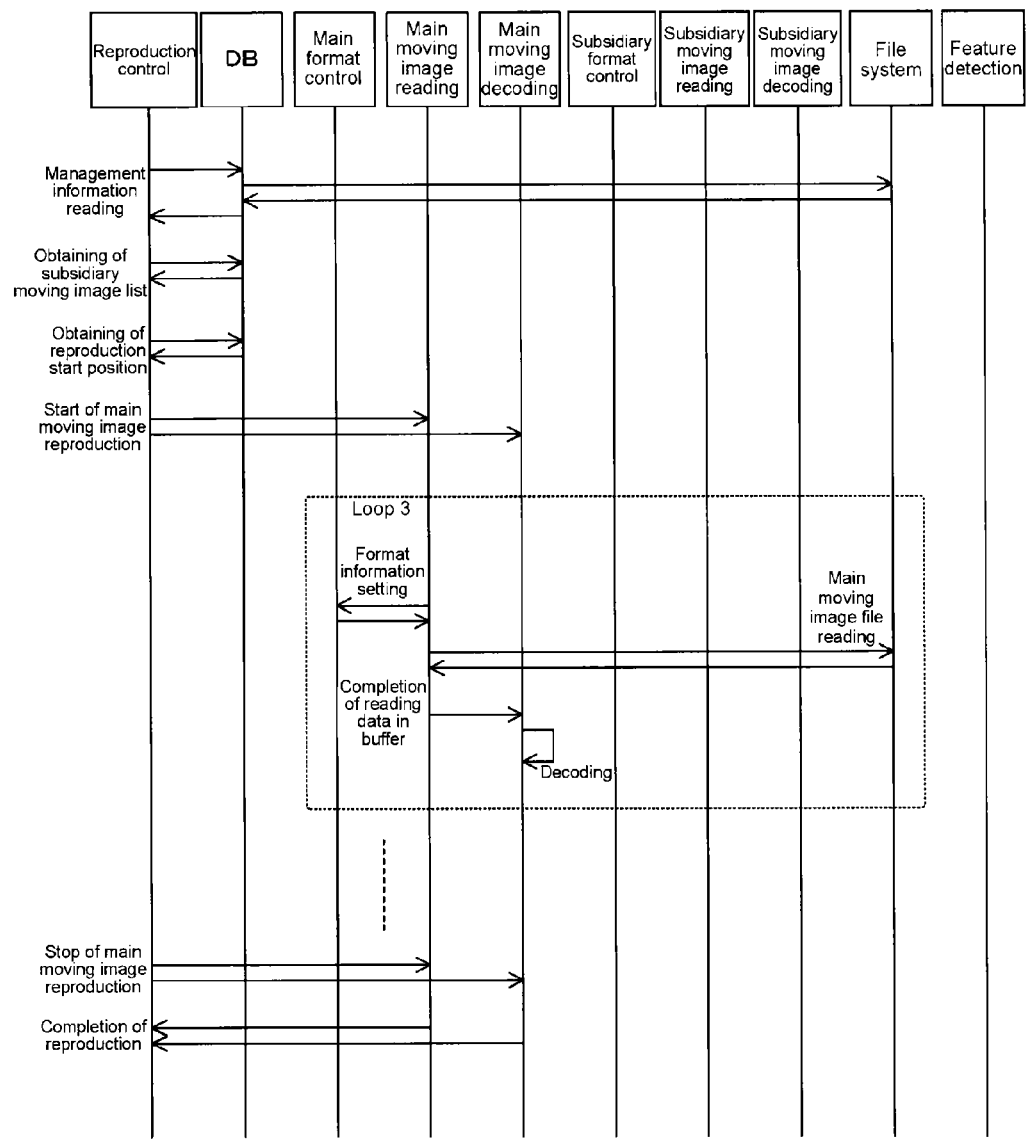
FIG. 9 is a sequence chart showing an operation example of index reproduction according to the embodiment of the present invention.

FIG. 9 is a sequence chart showing an operation example of index reproduction according to the embodiment of the present invention. Herein, when any one of the subsidiary moving images is selected from a list thereof, a main moving image associated with the selected subsidiary moving image is reproduced from a position indicated by the time information of the main moving image.

The system controller 290 reads the management information file through the file system 280 to obtain the list of the subsidiary moving images based on the management information file. For example, when an initial image of the subsidiary moving image is contained as a thumbnail, a list of thumbnails may be displayed. In this case, each of the subsidiary moving images is associated with the corresponding main moving image and the reproduction start position in the main moving image.

When any one of the subsidiary moving images is selected via the operation input reception portion 291, the system controller 290 instructs the encoder/decoder 220 and the main access controller 271 to reproduce the main moving image (moving image reproduction start instruction).

Upon reception of the moving image reproduction start instruction, the main access controller 271 notifies the main format controller 261 of an identifier of the main moving image to be reproduced and the time information at a reproduction start position, to obtain an address in the main moving image file. Upon completion of reading the main moving image data to a certain degree based on the obtained address, the main media controller 231 notifies the encoder/decoder 220 of completion of reading. Upon reception of the reading completion notification, the encoder/decoder 220 decodes the moving image data. The reading from the file and decoding are repeated each time new readout data is stored in the buffer (loop 3).

After that, upon completion of the reproduction to the end of the subsidiary moving images, or upon reception of a moving image reproduction stop instruction by the operation input reception portion 291, the system controller 290 instructs the encoder/decoder 220 to stop reproducing the main moving image, and instructs the main access controller 271 to stop reading of the main moving image data (moving image reproduction stop instruction).

When the reproduction stop is completed, the encoder/decoder 220 and the main access controller 271 notify the system controller 290 of the completion of the reproduction. When receiving the completion notification of reproducing the main moving image, the system controller 290 closes the file.

Figure 10:
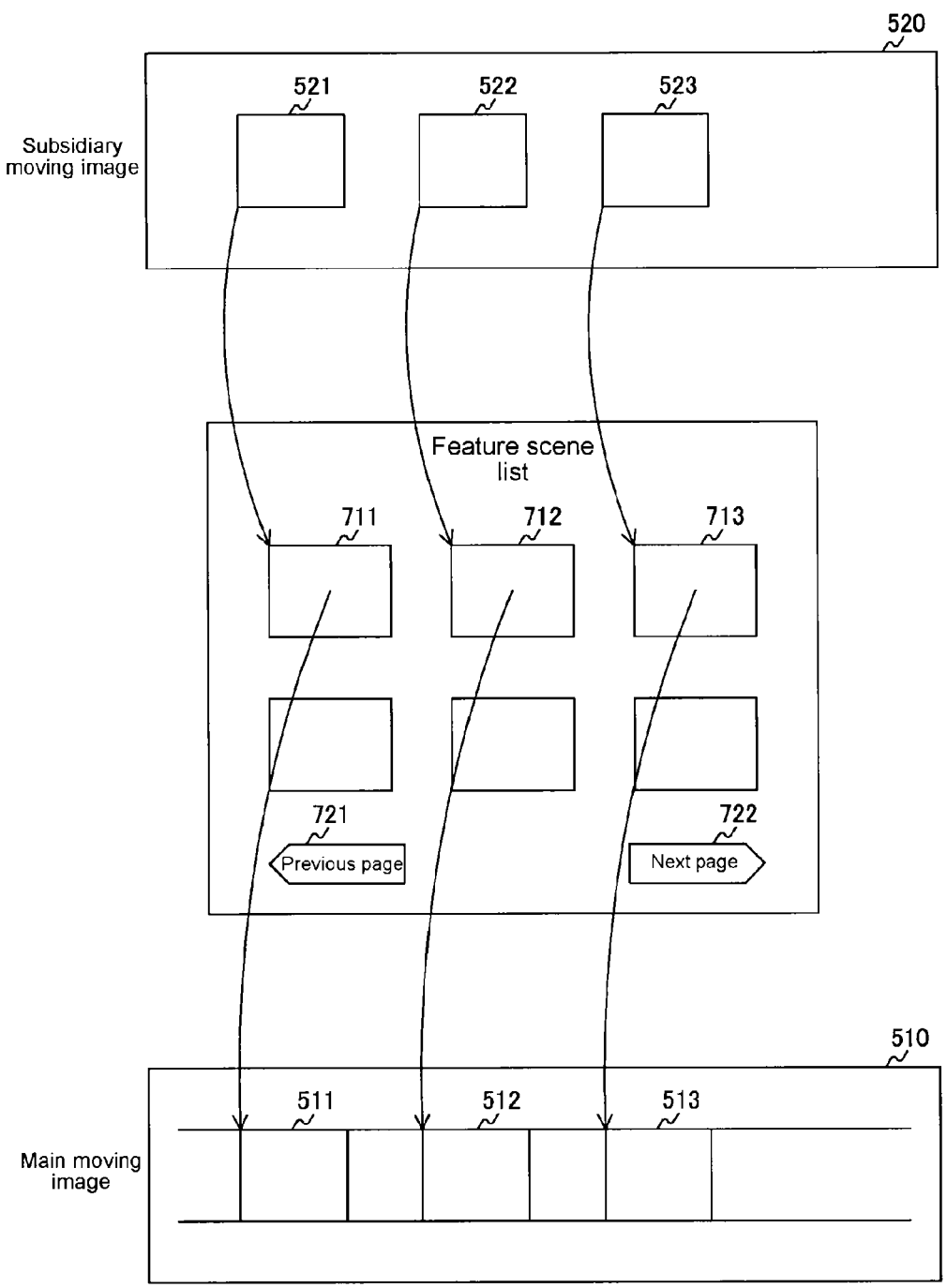
FIG. 10 is a diagram showing a utility example of the subsidiary moving images according to the embodiment of the present invention.

FIG. 10 is a diagram showing a utility example of the subsidiary moving images according to the embodiment of the present invention. In this example, a subsidiary moving image 520 is recorded with low image quality, and thumbnails of respective subsidiary moving images are used as thumbnails in a feature scene list. For example, thumbnails of subsidiary moving image 521, 522, and 523 are indicated as thumbnails 711, 712, and 713, respectively.

For the thumbnails in the feature scene list, still images of any scenes that represent corresponding subsidiary moving images can be used. Further, for the feature scene list, instead of the thumbnails of the still images, the subsidiary moving images may be displayed as they are. For example, by moving a mouse cursor onto a thumbnail area, the subsidiary moving image may be reproduced in the thumbnail area. It is to be noted that buttons for turning a page being displayed are provided in the feature scene list. When a previous page turn button 721 is selected, the page currently displayed is turned to the previous one. When a next page turn button 722 is selected, the page is turned to the next page.

When one of the thumbnails is selected in the feature scene list, reproduction is started from the corresponding position in a main moving image 510. For example, when a thumbnail 711 is selected, a main moving image 511 corresponding to the subsidiary moving image 521 is reproduced. After the reproduction of the main moving image 511, reproduction of the main moving image 510 may be temporarily stopped or may be continued.

In accordance with the utility example, by using the subsidiary moving images for display in the feature scene list, the main moving image can be reproduced from the corresponding positions thereof. The subsidiary moving images in the feature scene list include the feature data, and therefore can provide indexes of particularly interesting scenes for the user.

Figure 11:
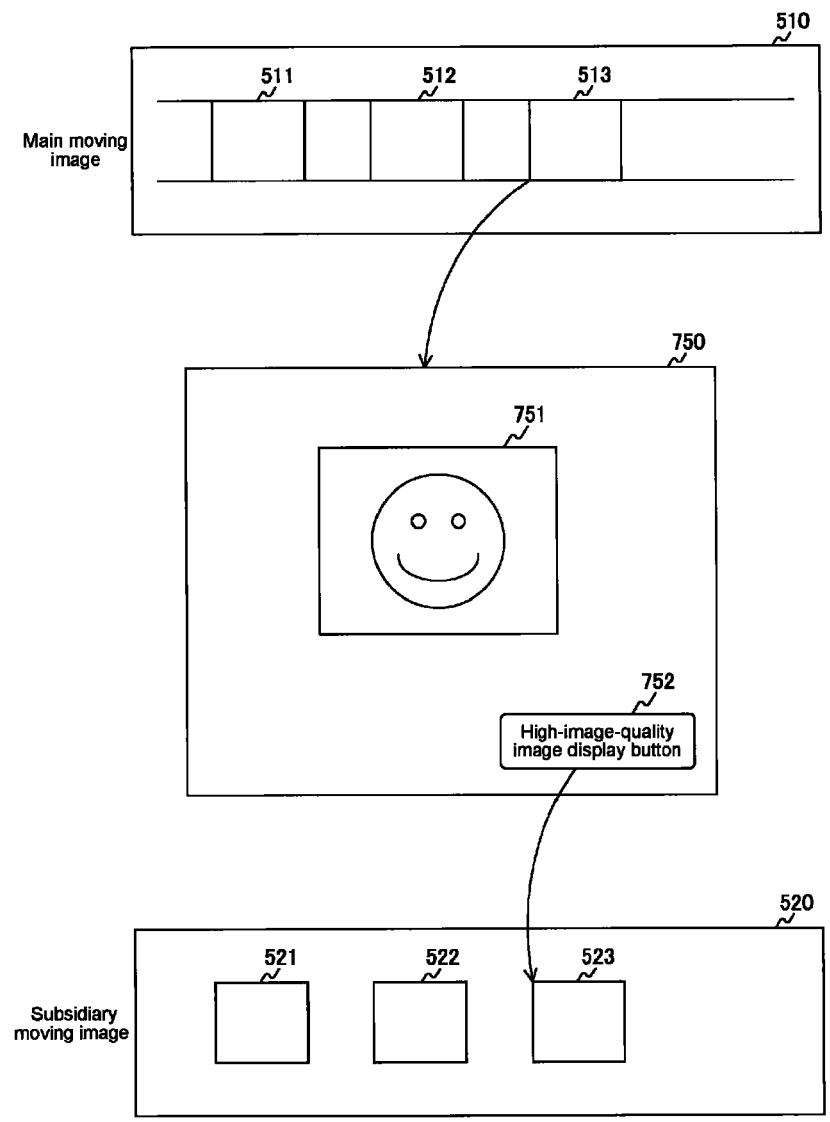
FIG. 11 is a diagram showing another utility example of the subsidiary moving images according to the embodiment of the present invention.

FIG. 11 is a diagram showing another utility example of the subsidiary moving images according to the embodiment of the present invention. In this example, the subsidiary moving image 520 is recorded with high image quality. In this case, the main moving image 510 is reproduced and displayed on an image display window 751 in a screen 750.

During the reproduction and display, when a displaying image gets to a position where the corresponding subsidiary moving image exists, a high-image-quality image display button 752 is displayed, which prompts the user to press the button 752. While the main moving image 513 is displayed, when the user presses the high-image-quality image display button 752, the corresponding subsidiary moving image 523 is reproduced and displayed.

In accordance with the utility example, the high-image-quality subsidiary moving images are partly recorded along with the main moving image, and thus the parts of the main moving image can be switched to the corresponding high-image-quality subsidiary moving images during reproduction thereof. In this case, the high-image-quality subsidiary moving images do not have to be recorded over the entire sections of the main moving image, but only need to be recorded for feature sections thereof. Accordingly, increase in data size can be prevented, and high-quality image reproduction can be realized for only the particularly interesting scenes for the user.

Figure 12:
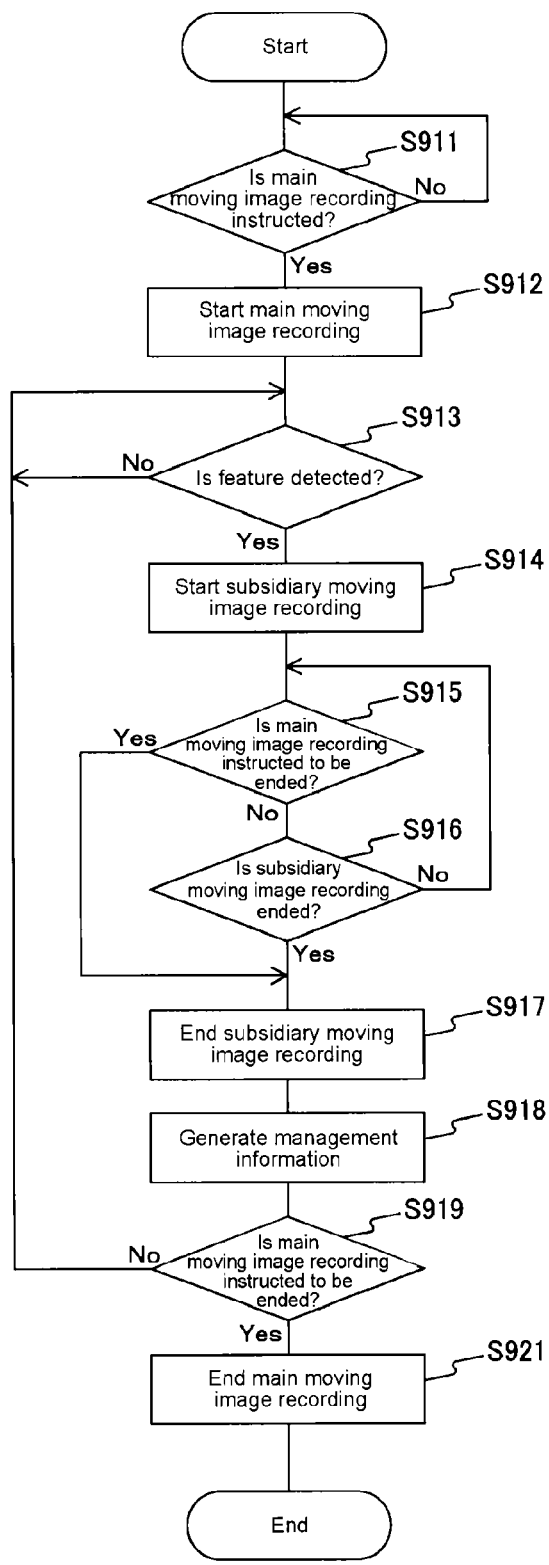
FIG. 12 is a flowchart showing processing steps of recording a moving image in the recording/reproducing apparatus according to the embodiment of the present invention.

FIG. 12 is a flowchart showing processing steps of recording the moving image in the recording/reproducing apparatus 200 according to the embodiment of the present invention. The recording/reproducing apparatus 200 stands by for an instruction of recording the main moving image from the user. When receiving the main moving image recording instruction at the operation input reception portion 291 (Step 911), the recording/reproducing apparatus 200 starts recording of the main moving image data supplied from the data input portion 211 (Step 912).

When the feature detector 250 detects a feature (e.g., face image) contained in the data supplied from the data input portion (Step 913), the recording/reproducing apparatus 200 starts recording of the subsidiary moving image of data supplied from the data input portion 211 (Step 914). After that, the main moving image and the subsidiary moving image are concurrently recorded until completion of the recording of either one of the moving images (Steps 915 and 916).

At timing after a certain time period from the start of recording the subsidiary moving images, or at timing when feature data is not detected any more, the recording of the subsidiary moving images is ended (Step 917). In addition, the time information that indicates the temporal positions of the subsidiary moving images in the main moving image is generated and recorded as the management information shown in FIG. 4 (Step 918).

When the operation input reception portion 291 receives the main moving image recording stop instruction (Step 919), the recording of the main moving image is ended (Step 921).

Figure 13:
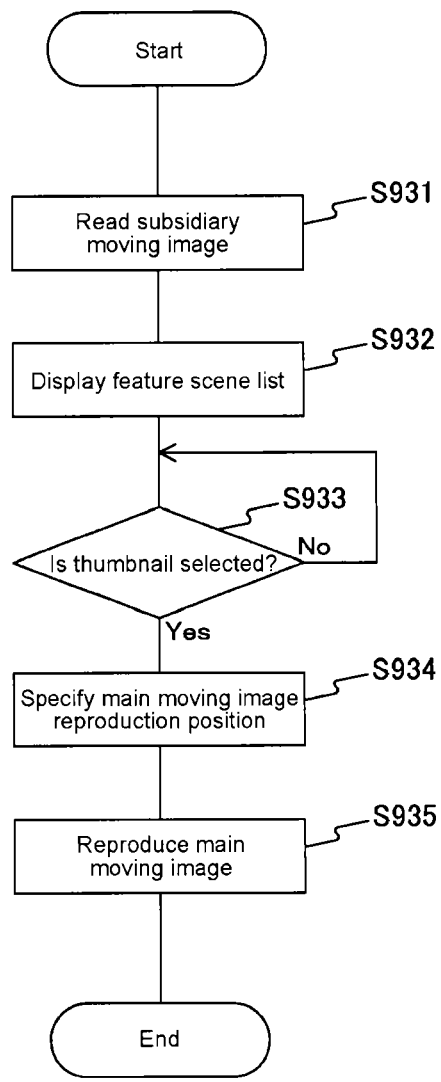
FIG. 13 is a flowchart showing processing steps of reproduction from a feature scene list in the recording/reproducing apparatus according to the embodiment of the present invention.

FIG. 13 is a flowchart showing processing steps of reproduction from the feature scene list in the recording/reproducing apparatus 200 according to the embodiment of the present invention. When the operation input reception portion 291 gives an instruction of displaying the feature scene list, the subsidiary moving image data is read (Step 931), to thereby display the feature scene list as shown in FIG. 10 (Step 932).

Then, when any one of the thumbnails in the feature scene list is selected (Step 933), a position in the main moving image corresponding to the selected thumbnail is specified based on the management information shown in FIG. 4 (Step 934), and the main moving image is reproduced and displayed from the specified reproduction position (Step 935).

Figure 14:
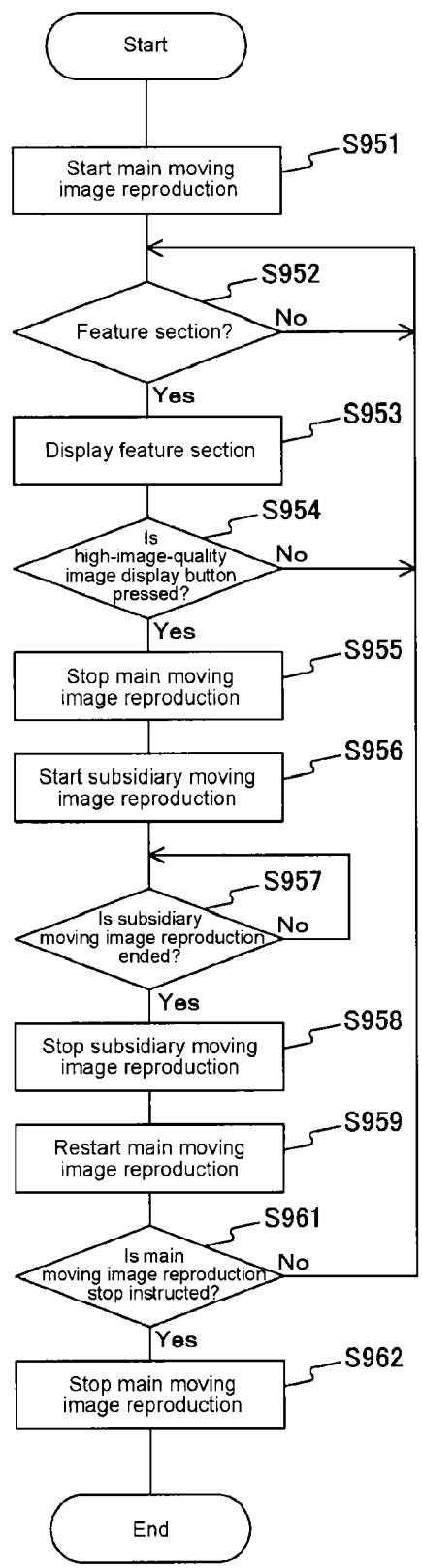
FIG. 14 is a flowchart showing processing steps of reproducing feature sections in the recording/reproducing apparatus according to the embodiment of the present invention.

FIG. 14 is a flowchart showing processing steps of reproducing the feature sections in the recording/reproducing apparatus 200 according to the embodiment of the present invention. When the operation input reception portion 291 receives an instruction of reproducing the main moving image, the reproduction of the main moving image is started (Step 951). After that, when the reproduction position of the main moving image reaches one of the feature sections (Step 952), this fact is indicated (Step 953). For the indication, for example, the high-image-quality image display button 752 shown in FIG. 11 is displayed. In this case, when the high-image-quality image display button 752 is pressed (Step 954), the reproduction of the main moving image is stopped (Step 955), and the corresponding subsidiary moving image starts to be reproduced (Step 956).

Subsequently, when the subsidiary moving image is totally reproduced, or when the user gives an instruction of stopping the reproduction of the subsidiary moving image (Step 957), the reproduction of the subsidiary moving image is stopped (Step 958) and the reproduction of the main moving image is restarted (Step 959). In this embodiment, the position at which the reproduction of the subsidiary moving image is stopped corresponds to a reproduction restart position of the main moving image.

Step 952 and the subsequent steps are repeated until the operation input reception portion 291 receives the main moving image reproduction stop instruction. When this instruction is received (Step 961), the reproduction of the main and subsidiary moving images is stopped (Step 962).

As described above, according to the embodiment of the present invention, the detection by the feature detector 250 of the feature data from the data input during the recording of the main moving image leads to recording of the subsidiary moving images concurrently with the main moving image. As a result, the subsidiary moving images whose image quality attributes are different from those of the main moving image in the feature sections can be recorded and reproduced. The subsidiary moving images can be used as selection target images for selection from the feature scene list, and can be used as high-image-quality reproduction images corresponding to the main moving image.

The recording/reproducing apparatus 200 according to the embodiment of the present invention is described heretofore. The present invention can also be applied to an image pickup apparatus. Hereinafter, an image pickup apparatus 100 will be described as an example.

Figure 15:
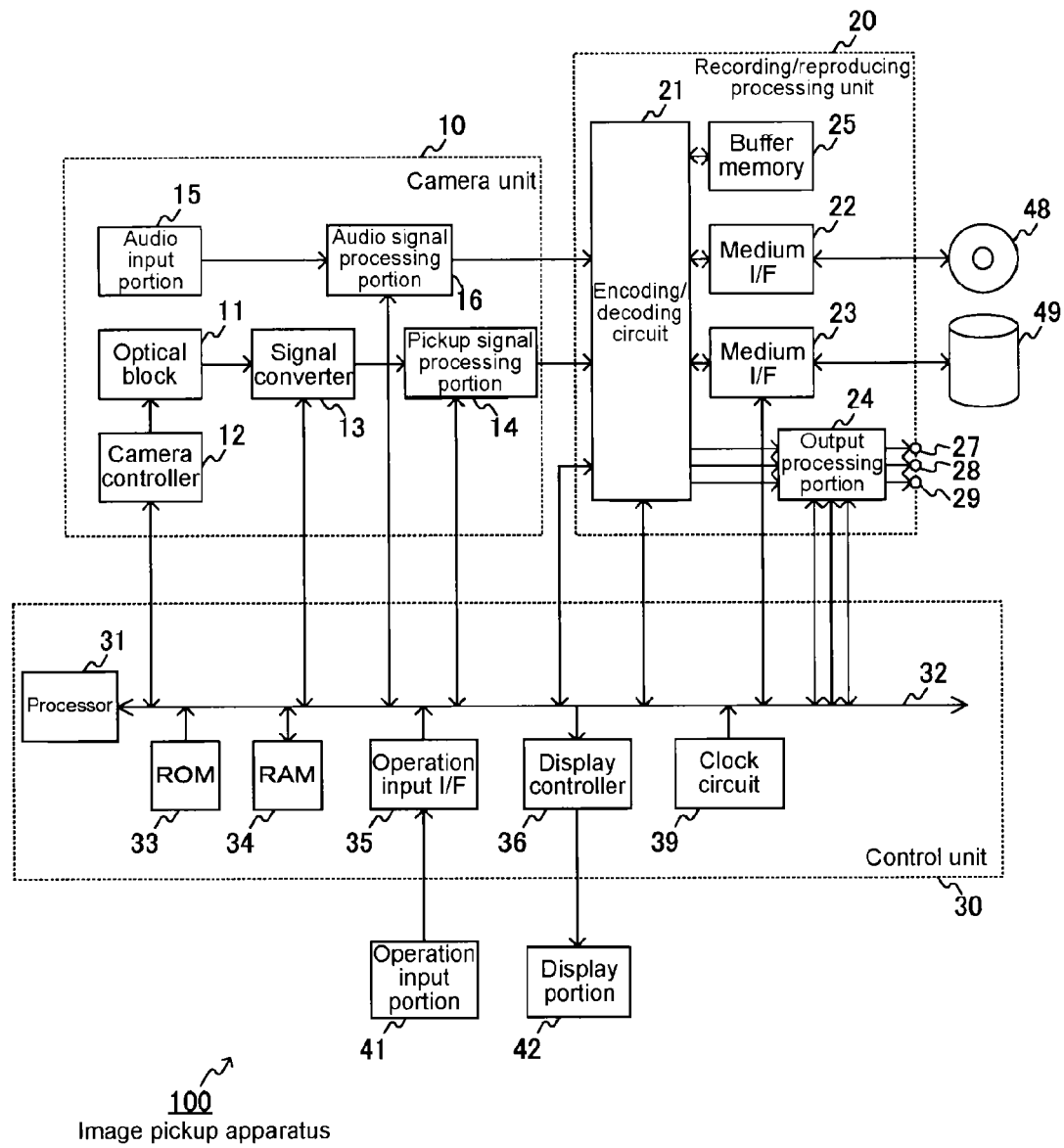
FIG. 15 is a diagram showing a configuration example of an image pickup apparatus according the embodiment of the present invention.

FIG. 15 is a diagram showing a configuration example of the image pickup apparatus 100 according to the embodiment of the present invention. The image pickup apparatus 100 includes a camera unit 10, a recording/reproducing processing unit 20, and a control unit 30.

The camera unit 10 includes an optical block 11, a camera controller 12, a signal converter 13, a pickup signal processing portion 14, an audio input portion 15, and an audio signal processing portion 16. The optical block 11 includes a lens group for picking up an image of a subject, an aperture adjustment mechanism, a focus adjustment mechanism, a zoom mechanism, a shutter mechanism, a flash mechanism, a hand movement correction mechanism, and the like. The camera controller 12 receives a control signal supplied from the control unit 30, generates a control signal to be supplied to the optical block 11, and supplies the generated control signal to the optical block 11, to thereby perform zoom control, shutter control, exposure control, and the like.

The signal converter 13 is formed of an image pickup device such as a CCD (Charge Coupled Device). On an imaging surface thereof, an image is formed via the optical block 11. The signal converter 13 receives an image-capture timing signal supplied from the control unit 30 in response to a shutter operation, converts a subject image formed on the imaging surface into a pickup signal, and supplies the signal to the pickup signal processing portion 14.

The pickup signal processing portion 14 conducts a gamma correction, an AGC (Auto Gain Control), and the like on the pickup signal based on the control signal supplied from the control unit 30, and converts the pickup signal into an image signal as a digital signal. The audio input portion 15 collects audio around the subject at the time of shooting. The audio signal from the audio input portion 15 is supplied to the audio signal processing portion 16. The audio signal processing portion 16 performs a correction, the AGC, and the like on the audio signal based on the control signal supplied from the control unit 30, and converts the audio signal into a digital signal.

The recording/reproducing processing unit 20 includes an encoding/decoding circuit 21, medium interfaces 22 and 23, an output processing portion 24, and a buffer memory 25.

The encoding/decoding circuit 21 has an encoding function of encoding and multiplexing the image signal from the camera unit 10, an audio signal, and additional recording information, and converting them into compressed data. In addition, the encoding/decoding circuit 21 has a decoding function of separating the image signal, the audio signal, and the additional recording information from the compressed data and decoding them. Further, the encoding/decoding circuit 21 performs automatic white balance control, exposure correction control, zoom control depending on a magnification of a digital zoom, on the image signal supplied from the pickup signal processing portion 14 based on the control signal from the control unit 30. Further, the encoding/decoding circuit 21 has a function of extracting feature data from the image signal and the audio signal sent from the camera unit 10.

The medium interfaces 22 and 23 receive the compressed data from the encoding/decoding circuit 21 and write the data in recording media 48 and 49, respectively. Further, the medium interfaces 22 and 23 read the compressed data from the recording media 48 and 49, respectively, and supply the data to the encoding/decoding circuit 21. For the recording media 48 and 49, for example, a disc-shaped recording medium such as a DVD, a semiconductor memory such as a memory card, and a hard disc can be used.

The output processing portion 24 supplies the compressed data from the encoding/decoding circuit 21 to the control unit 30 or output terminals 27 to 29 under control of the control unit 30. The buffer memory 25 is constituted of an SDRAM (Synchronous Dynamic Random Access Memory) or the like, and is used as a work area for encoding or decoding in the encoding/decoding circuit 21.

The control unit 30 includes a processor 31, a ROM (Read Only Memory) 33, a RAM (Random Access Memory) 34, an operation input interface 35, a display controller 36, and a clock circuit 39, which are connected via a system bus 32. The operation input interface 35 is connected with an operation input portion 41. The display controller 36 is connected with a display portion 42. The clock circuit 39 records shooting times.

The processor 31 performs overall processing of the control unit 30 with the use of the RAM 34 as the work area. A program for controlling the camera unit 10 and a program for controlling recording/reproducing of the image signal and the audio signal are written in the ROM 33.

To the operation input portion 41 connected to the operation input interface 35, a plurality of keys such as a mode switch key, a zoom adjustment key, an exposure adjustment key, a shutter key, a moving image shooting key, and a display adjustment key are provided. The mode switch key is used to make a switch between a shooting mode and another mode such as a reproducing mode. The display adjustment key is used in the display portion 42. The operation input interface 35 transmits the operation signal from the operation input portion 41 to the processor 31. The processor 31 discriminates a key that has been operated at the operation input portion 41 from the other keys, and performs control processing according to the discrimination result.

The display portion 42 connected to the display controller 36 is formed of an LCD (Liquid Crystal Display) or the like, and displays the image signal from the camera unit 10 or the image signal read from the recording medium 49 under the control of the processor 31. The clock circuit 39 generates time information that indicates, e.g., year, month, day, hour, minute, and second.

In the image pickup apparatus 100, the camera unit 10 corresponds to the data input portion 211 in the recording/reproducing apparatus 200 shown in FIG. 1. In addition, the display controller 36 corresponds to the data output portion 212 in the recording/reproducing apparatus 200. The operation input interface 35 corresponds to the operation input reception portion 291 in the recording/reproducing apparatus 200. The encoding/reproducing circuit 21 corresponds to the encoder/decoder 220, the time information management portion 229, and the feature detector 250 in the recording/reproducing apparatus 200. Further, the processor 31 corresponds to the main format controller 261, the subsidiary format controller 262, the main access controller 271, the subsidiary access controller 272, the file system 280, and the system controller 290 in the recording/reproducing apparatus 200. Further, the medium interfaces 22 and 23 respectively correspond to the main media controller 231 and the subsidiary media controller 232 in the recording/reproducing apparatus 200.

As described above, the present invention can be applied to not only the recording/reproducing apparatus 200 but also the image pickup apparatus 100.

It should be understood by those skilled in the art that various modifications, combinations, sub-combinations and alterations may occur depending on design requirements and other factors insofar as they are within the scope of the appended claims or the equivalents thereof.

According to an embodiment of the present invention, there is provided a recording apparatus. The recording apparatus includes data input means, first moving image signal recording means, condition detection means, and second moving image signal recording means. The data input means inputs data. The first moving image signal recording means records, based on the input data, a first moving image signal having a first image quality attribute. The condition detection means detects that the input data satisfies a predetermined condition during recording of the first moving image signal. The second moving image signal recording means records, based on the input data, a second moving image signal having a second image quality attribute when the condition detection means detects that the input data satisfies the predetermined condition.

In this embodiment, for example, the data input means corresponds to the data input portion 211. The first moving image signal recording means corresponds to the main encoder 222 and the main media controller 231. The condition detection means corresponds to the feature detector 250. The second moving image signal recording means corresponds to the subsidiary encoder 223 and the subsidiary media controller 232.

The recording apparatus further includes management information recording means for recording management information that indicates association between the second moving image signal and a record position thereof in the first moving image signal.

In this embodiment, the management information holding means corresponds to the management information file 415 or 422, for example.

According to another embodiment of the present invention, there is provided an image pickup apparatus. The image pickup apparatus includes imaging means, first moving image signal recording means, condition detection means, and second moving image signal recording means. The imaging means images a subject to generate imaging data thereof. The first moving image signal recording means records, based on the imaging data, a first moving image signal having a first image quality attribute. The condition detection means detects that the imaging data satisfies a predetermined condition during recording of the first moving image signal. The second moving image signal recording means records, based on the imaging data, a second moving image signal having a second image quality attribute when the condition detection means detects that the imaging data satisfies the predetermined condition.

In this embodiment, for example, the image pickup means corresponds to the camera unit 10. The first moving image signal recording means corresponds to the main encoder 222 and the main media controller 231. The condition detection means corresponds to the feature detector 250. The second moving image signal recording means corresponds to the subsidiary encoder 223 and the subsidiary media controller 232.

According to another embodiment of the present invention, there is provided a reproducing apparatus. The reproducing apparatus includes first holding means, second holding means, management information holding means, list display means, operation reception means, and reproducing means. The first holding means holds a first moving image signal. The second holding means holds a second moving image signal that has an image quality attribute with image quality lower than that of the first moving image signal. The management information holding means holds management information that indicates association between the second moving image signal and a record position thereof in the first moving image signal. The list display means displays a list of the second moving image signals. The operation reception means receives an operation of selecting one of the second moving image signals in the list. The reproducing means extracts, when the one of the second moving image signals is selected, a record position in the first moving image signal associated with the selected second moving image signal based on the management information, and reproduces the first moving image signal from the record position.

In this embodiment, for example, the first holding means corresponds to the recording medium 241. The second holding means corresponds to the recording medium 242. The management information holding means corresponds to the management information file 415 or 422. The list display means corresponds to the data output portion 212. The operation reception means corresponds to the operation input reception portion 291. The reproducing means corresponds to the main media controller 231 and the main decoder 224.

According to another embodiment of the present invention, there is provided a reproducing apparatus including first holding means, second holding means, management information holding means, reproducing means, and operation reception means. The first holding means holds a first moving image signal. The second holding means holds a second moving image signal that has an image quality attribute with image quality higher than that of the first moving image signal. The management information holding means holds management information that indicates association between the second moving image signal and a record position thereof in the first moving image signal. The reproducing means shows, when the management information indicates a presence of a second moving image signal associated with the corresponding record position of the first moving image signal, the presence of the second moving image signal during reproducing of the first moving image. The operation reception means receives an instruction operation of reproducing the second moving image signal. The reproducing means reproduces the second moving image signal in response to the instruction operation of reproducing the second moving image signal.

In this embodiment, for example, the first holding means corresponds to the recording medium 241. The second holding means corresponds to the recording medium 242. The management information holding means corresponds to management information file 415 or 422. The reproducing means corresponds to the subsidiary media controller 232 and the subsidiary decoder 225. The operation reception means corresponds to the operation input reception portion 291.

According to another embodiment of the present invention, there is provided a recording/reproducing apparatus. The recording/reproducing apparatus includes data input means, first moving image signal recording means, condition detection means, second moving image signal recording means, management information recording means, list display means, operation reception means, and reproducing means. The data input means inputs data. The first moving image signal recording means records, based on the input data, a first moving image signal having a first image quality attribute. The condition detection means detects that the input data satisfies a predetermined condition during recording of the first moving image signal. The second moving image signal recording means records, based on the input data, a second moving image signal having a second image quality attribute when the condition detection means detects that the input data satisfies the predetermined condition. The management information recording means records management information that indicates association between the second moving image signal and a record position thereof in the first moving image signal. The list display means displays a list of the second moving image signals. The operation reception means receives an operation of selecting one of the second moving image signals in the list. The reproducing means extracts, when the one of the second moving image signals is selected, a record position in the first moving image signal associated with the selected second moving image signal based on the management information, and reproduces the first moving image signal from the record position.

In this embodiment, for example, the data input means corresponds to the data input portion 211. The first moving image signal recording means corresponds to the main encoder 222 and the main media controller 231. The condition detection means corresponds to the feature detector 250. The second moving image signal recording means corresponds to the subsidiary encoder 223 and the subsidiary media controller 232. The management information holding means corresponds to the management information file 415 or 422: The list display means corresponds to the data output portion 212. The operation reception means corresponds to the operation input reception portion 291. The reproducing means corresponds to the main media controller 231 and the main decoder 224.

According to another embodiment of the present invention, there is provided a recording/reproducing apparatus. The recording/reproducing apparatus includes data input means, first moving image signal recording means, condition detection means, second moving image signal recording means, management information recording means, reproducing means, and operation reception means. The data input means inputs data. The first moving image signal recording means records, based on the input data, a first moving image signal having a first image quality attribute. The condition detection means detects that the input data satisfies a predetermined condition during recording of the first moving image signal. The second moving image signal recording means records, based on the input data, a second moving image signal having a second image quality attribute when the condition detection means detects that the input data satisfies the predetermined condition. The management information recording means records management information that indicates association between the second moving image signal and a record position thereof in the first moving image signal. The reproducing means shows, when the management information indicates a presence of a second moving image signal associated with the corresponding record position of the first moving image signal, the presence of the second moving image signal during reproducing of the first moving image. The operation reception means receives an instruction operation of reproducing the second moving image signal. The reproducing means reproduces the second moving image signal in response to the instruction operation of reproducing the second moving image signal.

In this embodiment, for example, the data input means corresponds to the data input portion 211. The first moving image signal recording means corresponds to the main encoder 222 and the main media controller 231. The condition detection means corresponds to the feature detector 250. The second moving image signal recording means corresponds to the subsidiary encoder 223 and the subsidiary media controller 232. The management information holding means corresponds to the management information file 415 or 422. The reproducing means corresponds to the subsidiary media controller 232 and the subsidiary decoder 225. The operation reception means corresponds to the operation input reception portion 291.

According to another embodiment of the present invention, there is provided a recording method for a recording apparatus configured to record a first moving image signal having a first image quality attribute and a second moving image signal having a second image quality attribute based on input data. The recording method includes recording the first moving image signal in response to an instruction of recording the first moving image signal, detecting that the input data satisfies a predetermined condition during recording of the first moving image signal, and recording the second moving image signal when the predetermined condition is detected to be satisfied by the input data.

According to another embodiment of the present invention, there is provided a program in a recording apparatus including first moving image signal recording means for recording a first moving image signal having a first image quality attribute based on input data and second moving image signal recording means for recording a second moving image signal having a second image quality attribute based on the input data. The program causes a computer to execute the steps of causing the first moving image signal recording means to record the first moving image signal in response to an instruction of recording the first moving image signal, detecting that the input data satisfies a predetermined condition during recording of the first moving image signal, and causing the second moving image signal recording means to record the second moving image signal when the predetermined condition is detected to be satisfied by the input data.

In these embodiments, for example, the first moving image signal recording step corresponds to Step 912. The condition detecting step corresponds to Step 913. The second moving image signal recording step corresponds to Step 914.

It should be noted that the processing steps described in the embodiment of the present invention may be considered as a method composed of the series of steps, or as a program for causing a computer to execute the series of steps or a recording medium that stores the program.

What is claimed is:

1. An apparatus comprising:
   processing circuitry configured to
      generate a plurality of second moving image signal segments, each segment corresponding to a respective section of a first moving image signal, each respective section being a part of a first moving image having a predetermined feature, an image quality attribute of each segment of the second moving image signal being different from the corresponding section of the first moving image signal, and wherein each frame included in the segment of the second moving image signal represents data included in each corresponding frame of the corresponding section of the first moving image signal in its entirety, such that the processing circuitry generates the plurality of second moving image signal segments, each frame of which includes an entire image from each corresponding frame of the corresponding section of the first moving image signal, but at a different image quality attribute, in response to detecting the predetermined feature in the first moving image, and
      associate each segment of the second moving image signal with the corresponding section of the first moving image signal.

2. The apparatus according to claim 1, wherein the predetermined feature is face image data.

3. The apparatus according to claim 1, wherein the predetermined feature is audio data.

4. The apparatus according to claim 1, wherein the processing circuitry is configured to continuously generate the plurality of second moving image signal segments while the first moving image signal has the predetermined feature.

5. The apparatus according to claim 1, wherein
   the processing circuitry is configured to continuously generate the plurality of second moving image signal segments for a predetermined time period starting from when the first moving image signal has the predetermined feature.

6. The apparatus according to claim 1, wherein the processing circuitry is further configured to record the first moving image signal and the plurality of second moving image signal segments.

7. The apparatus according to claim 6, wherein the first moving image signal and the plurality of second moving image signal segments are recorded separately in different folders.

8. The apparatus according to claim 6, wherein
   the processing circuitry is further configured to record management information that indicates association between the second moving image signal segments and a respective record position thereof in the first moving image signal.

9. The apparatus according to claim 8, wherein the record position is represented by time information of the first moving image signal.

10. The apparatus according to claim 1, wherein the image quality attribute of the corresponding section of the first moving image signal has a higher image quality than the corresponding segment of the second moving image signal.

11. The apparatus according to claim 1, wherein the image quality attribute of the corresponding section of the first moving image signal has a lower image quality than the corresponding segment of the second moving image signal.

12. The apparatus according to claim 1, wherein the image quality attribute of the corresponding section of the first moving image signal has a higher bit rate than the corresponding segment of the second moving image signal.

13. The apparatus according to claim 1, wherein the image quality attribute of the corresponding section of the first moving image signal has a lower bit rate than the corresponding segment of the second moving image signal.

14. The apparatus according to claim 1, wherein the image quality attribute of the first moving image signal is HD format.

15. A method of recording data, comprising:
   generating, by processing circuitry, a plurality of second moving image signal segments, each segment corresponding to a respective section of a first moving image signal, each respective section being a part of a first moving image having a predetermined feature, an image quality attribute of each segment of the second moving image signal being different from the corresponding section of the first moving image signal, and wherein each frame included in the segment of the second moving image signal represents data included in each corresponding frame of the corresponding section of the first moving image signal in its entirety, such that the generating generates the plurality of second moving image signal segments, each frame of which includes an entire image from each corresponding frame of the corresponding section of the first moving image signal, but at a different image quality attribute, in response to detecting the predetermined feature in the first moving image; and
   associating, by the processing circuitry, each segment of the second moving image signal with the corresponding section of the first moving image signal.

16. The method of claim 15, further comprising:
   continuously generating, by the processing circuitry, the plurality of second moving image signal segments, white the first moving image signal has the predetermined feature.

17. The method of claim 15, wherein the predetermined feature is one of face image data and audio data.

18. The method of claim 15, wherein the first moving image signal and the plurality of second moving image signal segments are recorded in distinct recording mediums.

19. A non-transitory computer readable medium including computer executable instructions that, when executed by a computer, cause the computer to execute a method of recording data, the method comprising:

generating a plurality of second moving image signal segments, each segment corresponding to a respective section of a first moving image signal, each respective section being a part of a first moving image having a predetermined feature, an image quality attribute of each segment of the second moving image signal being different from the corresponding section of the first moving image signal, and wherein each frame included in the segment of the second moving image signal represents data included in each corresponding frame of the corresponding section of the first moving image signal in its entirety, such that the generating generates the plurality of second moving image signal segments, each frame of which includes an entire image from each corresponding frame of the corresponding section of the first moving image signal, but at a different image quality attribute, in response to detecting the predetermined feature in the first moving image; and associating each segment of the second moving image signal with the corresponding section of the first moving image signal.

20. The non-transitory computer readable medium of claim 19, further comprising:

continuously generating the plurality of second moving image signal segments, while the first moving image signal has the predetermined feature.

21. The apparatus according to claim 1, wherein the processing circuitry is further configured to generate a button to be displayed on a display panel of the apparatus, the button indicating availability of the image quality attribute associated with the segment of the second moving image signal.

* * * * *